United States Patent
Yeo et al.

(10) Patent No.: US 7,444,735 B2
(45) Date of Patent: Nov. 4, 2008

(54) PROCESS FOR MANUFACTURING AN INTEGRATED CIRCUIT SYSTEM

(75) Inventors: David Yeo, Singapore (SG); Victor Tan, Singapore (SG); Marvin Lo, Singapore (SG); Kai Keong Cheong, Singapore (SG); Stanley Bay, Singapore (SG); Anthony Yong, Singapore (SG)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 427 days.

(21) Appl. No.: 10/908,973

(22) Filed: Jun. 2, 2005

(65) Prior Publication Data

US 2005/0276028 A1    Dec. 15, 2005

Related U.S. Application Data

(60) Provisional application No. 60/580,086, filed on Jun. 15, 2004.

(51) Int. Cl.
*H01P 11/00* (2006.01)
*H01Q 1/38* (2006.01)

(52) U.S. Cl. .............................. 29/600; 29/601; 29/831; 29/840; 29/846; 343/700 MS

(58) Field of Classification Search .................. 29/600, 29/840, 841, 825, 830, 831, 827, 832, 601, 29/846, 847; 343/700 MS, 700 R, 767, 770, 343/771; 361/760, 783, 782; 438/200
See application file for complete search history.

(56) References Cited

U.S. PATENT DOCUMENTS

| | | | |
|---|---|---|---|
| 4,961,533 A | 10/1990 | Teller et al. | 177/25.19 |
| 5,216,430 A * | 6/1993 | Rahm et al. | 343/700 MS |
| 5,430,441 A | 7/1995 | Bickley et al. | 340/825.54 |
| 5,621,199 A | 4/1997 | Calari et al. | 235/375 |
| 6,365,498 B1 * | 4/2002 | Chu et al. | 438/612 |
| 6,614,392 B2 * | 9/2003 | Howard | 342/357.07 |
| 6,789,712 B2 | 9/2004 | Gates et al. | 221/401 |
| 2003/0045044 A1 * | 3/2003 | Dentry et al. | 438/200 |
| 2003/0234393 A1 | 12/2003 | Cowles et al. | 257/48 |
| 2003/0235929 A1 | 12/2003 | Cowles et al. | 438/17 |

* cited by examiner

*Primary Examiner*—Peter DungBa Vo
*Assistant Examiner*—Tai Nguyen
(74) *Attorney, Agent, or Firm*—Mikio Ishimaru

(57) ABSTRACT

A system for manufacturing an integrated circuit system having a substrate with a integrated circuit device. A first pad is formed on the substrate and connected to the integrated circuit device. A first dielectric layer is formed over the substrate and the first pad, with the first dielectric layer having an opening provided therein exposing the first pad. An upper redistribution layer is formed over the first dielectric layer. A portion of the upper redistribution layer is formed into an antenna with the antenna connected to the first pad. A second dielectric layer is formed over the first dielectric layer and over the antenna.

8 Claims, 5 Drawing Sheets

PROCESS FOR MANUFACTURING AN INTEGRATED CIRCUIT SYSTEM

CROSS-REFERENCE TO RELATED APPLICATION(S)

This application claims the benefit of U.S. Provisional Patent Application Ser. No. 60/580,086 filed Jun. 15, 2004.

FIELD OF THE INVENTION

The present invention relates generally to integrated circuits, and more particularly to radio frequency identification integrated circuit systems.

BACKGROUND OF THE INVENTION

In the stream of commerce, it is desirable to keep track of products shipped from a manufacturer or seller to a customer or end user in order to protect the product from loss or theft. Incidences of lost or misplaced cargo can detract significantly from the bottom line for both shipping companies and uninsured purchasers of lost or stolen products. Keeping track of where a particular package is located while enroute to a customer is a labor intensive task for the shipping company handling the package. In addition, the customer must rely on the shipping company to provide the current whereabouts of the product while enroute, and/or must access the shipping company's web site in order to locate that information.

Any shipping information known by the manufacturer or seller of a product is usually restricted to the information supplied at the time a shipping company takes physical possession of the product and identifies it by using, for example, an optical scanner.

While radio frequency identification (RFID) has been implemented in an effort to automate the tracking process (i.e., eliminate the reliance on a human package handler to provide the tracking information), the basic problem still remains: information cannot be easily obtained concerning the whereabouts of a package while en route. To resolve this problem, a low cost, compact, and unobtrusive means is needed to provide accurate tracking information of a package.

One method involves the use of bar codes and scanners. However, this method requires close proximity between the product carrying the bar code and the scanner.

Another method relies on RFID systems, which use radio frequency (RF) transponders to transfer information to interrogation stations. Unlike other information communication systems, RF transponder systems are not restricted to line-of-sight or hard-wire communications, and are most desirable where wireless communications are a necessity. Information transferred by a RF transponder system typically comprises identification data, but can also include messages, depending on the sophistication of the electronics used in the system.

RFID systems include an interrogator, which typically employs an exciter that transmits a RF excitation signal, and a transponder. The transponder is energized by the excitation signal to transmit a signal, including an identification code or other information, back to the interrogator. This is accomplished when the transponder receives a RF signal, or, more specifically, is energized by the RF magnetic field, and then forms a response signal that will identify the transponder and/or may provide additional information. The transponder then transmits the response signal to the interrogator. The interrogator includes a receiver that receives the response signal and processes the information it contains. This information is then recorded by a data management system.

One method of RFID works on an inductive principle where an interrogation station generates a magnetic field at a predetermined frequency. When the transponder enters this magnetic field, a small electric current is formed in the transponder, which provides power to the RFID electronic control components. These components then modulate the magnetic field in order to transmit the transponder's programmed data back to the interrogator. The interrogator receives the signal transmission, demodulates and decodes the transmission, and sends the data on to a host computer for further processing.

RF transponders are classified as either passive or active. Passive RF transponders extract their power from the electromagnetic field provided by the interrogator. An active RF transponder includes a radio transceiver and a battery power source, which enables it to transmit a signal to a remote receiver. The advantage of using active transponders is that they typically have increased range over passive transponders, but the disadvantage is that they require a battery power source to achieve that increased range.

Desirable though these RFID systems are, there have been problems with size, cost, and reliability.

Solutions to these problems have been long sought, but have also long eluded those skilled in the art.

SUMMARY OF THE INVENTION

The present invention provides a system for manufacturing an integrated circuit system having a substrate with an integrated circuit device. A first pad is formed on the substrate and connected to the integrated circuit device. A first dielectric layer is formed over the substrate and the first pad, with the first dielectric layer having an opening provided therein exposing the first pad. An upper redistribution layer is formed over the first dielectric layer. A portion of the upper redistribution layer is formed into an antenna with the antenna connected to the first pad. A second dielectric layer is formed over the first dielectric layer and over the antenna. This provides a means for accurate tracking of goods while en route to customers Certain embodiments of the invention have other advantages in addition to or in place of those mentioned above. The advantages will become apparent to those skilled in the art from a reading of the following detailed description when taken with reference to the accompanying drawings.

DESCRIPTION OF THE PREFERRED EMBODIMENT

In the following description, numerous specific details are given to provide a thorough understanding of the invention. However, it will be apparent that the invention may be practiced without these specific details. In order to avoid obscuring the present invention, some well-known process steps are not disclosed in detail.

Additionally, the drawings showing embodiments of the present invention are semi-diagrammatic and not to scale and, particularly, some of the dimensions are for the clarity of presentation and are shown greatly exaggerated in the FIGs. Generally, the device can be operated in any orientation.

The term "horizontal" as used herein is defined as a plane parallel to the conventional plane or surface of the substrate, regardless of its orientation. The term "vertical" refers to a direction perpendicular to the horizontal as just defined. Terms, such as "on", "above", "below", "bottom", "top", "side" (as in "sidewall"), "higher", "lower", "over", and "under", are defined with respect to the horizontal plane.

The term "processing" as used herein includes deposition of material or photoresist, patterning, exposure, development, etching, cleaning, and/or removal of the material or photoresist as required in forming a described structure.

Radio frequency (RF) readers are used to identify and track items having radio frequency identification (RFID) tags. The RFID tag contains relevant data pertaining to and identifying the item. As the RFID tag passes near the RF reader, a directional antenna in the RF reader emits RF signals towards the RFID tag. The emitted RF signals are received by an antenna RFID tag and induce an alternating current (AC) in the RFID tag for an attached integrated circuit device. The AC is used to "power-up" the IC to enable the RFID tag to transmit response signals from the RFID tag back to the RFID reader. The response signals typically contain the aforementioned relevant data in the IC pertaining to and identifying the tagged item.

Figure 1:
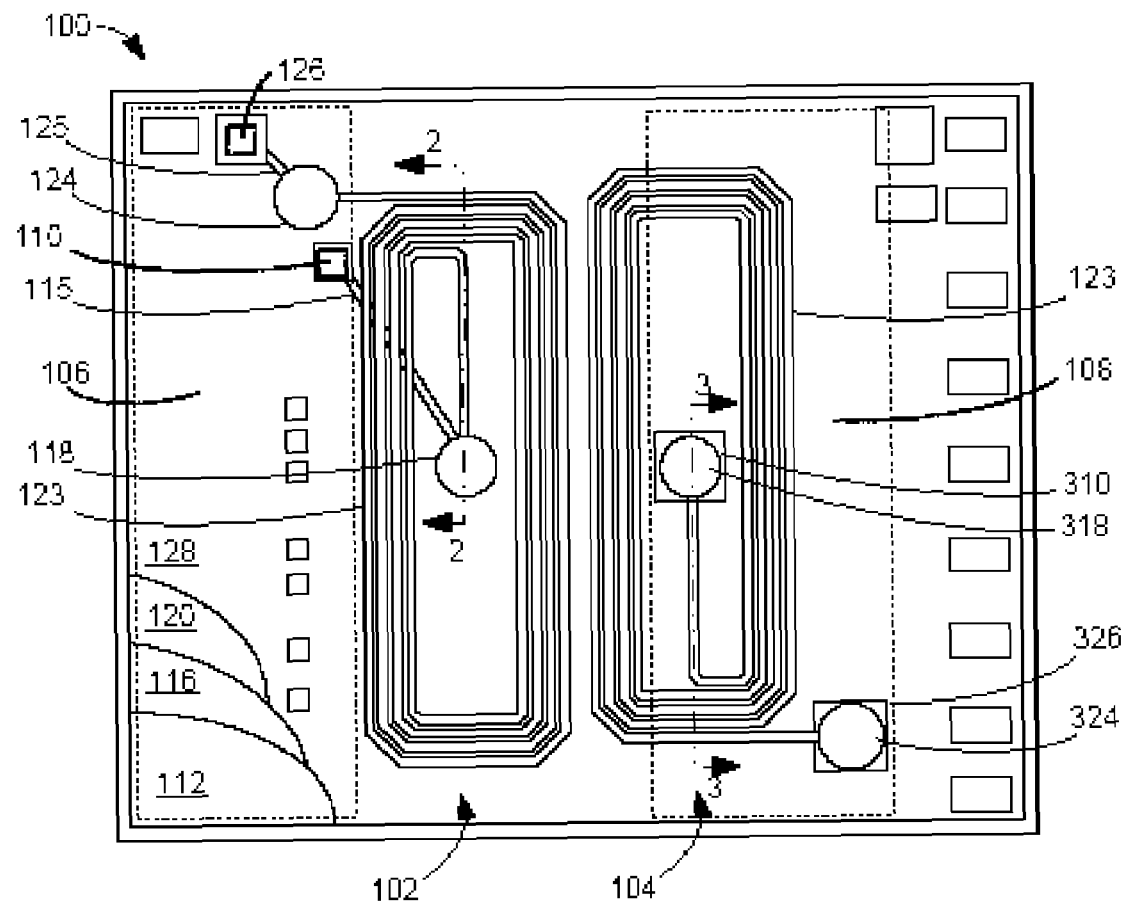
FIG. 1 is a plan view applicable to multiple embodiments of an integrated circuit system in accordance with the present invention.
Figure 2:
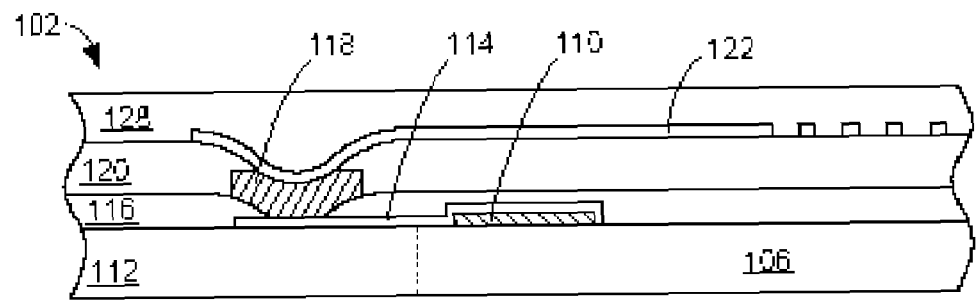
FIG. 2 is a cross-sectional view of a first embodiment of FIG. 1 taken along line 2-2.
Figure 3:
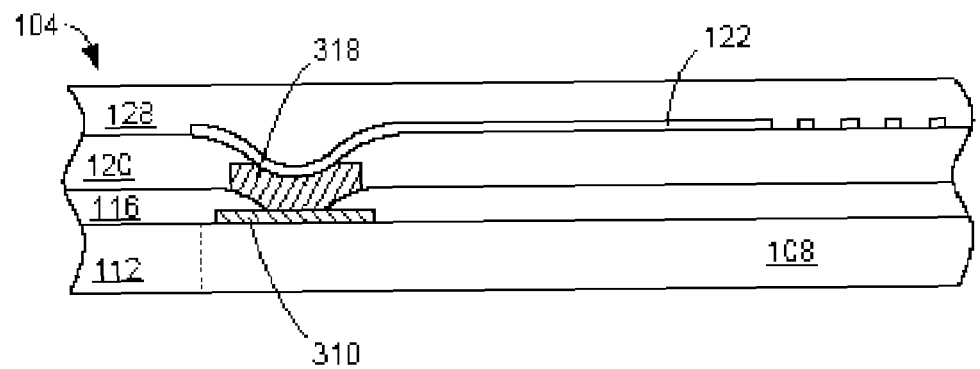
FIG. 3 is a cross-sectional view of a second embodiment of FIG. 1 taken along line 3-3.

Referring now to FIGS. 1, 2, and 3, therein are shown an integrated circuit system 100. FIG. 1 is a plan view applicable to multiple embodiments of the integrated circuit system 100 in accordance with the present invention. FIG. 2 is a cross-sectional view of a first embodiment of FIG. 1 taken along line 2-2, which shows a first antenna system 102. FIG. 3 is a cross-sectional view of a second embodiment of FIG. 1 taken along line 3-3, which shows a second antenna system 104.

The integrated circuit system 100 includes first and second integrated circuit devices, such as first and second RFID devices 106 and 108.

For the first antenna system 102, the first RFID device 106 is connected to a first pad 110 on a substrate 112. A lower redistribution layer (RDL) 114 is formed over the substrate 112 as shown in FIG. 2 and the first pad 110, and is patterned to form a conductive path 115 as shown in FIG. 1.

A first dielectric layer 116 is deposited on the substrate 112 and over the lower RDL 114 with an opening over a portion of the lower RDL 114 as shown in FIG. 2. For ease of explanation, various layers are shown as transparent and the same numbers are used to designate the same or similar elements.

A first pillar 118 is formed over the first dielectric layer 116 in the opening in the first dielectric layer 116 and is in contact with the lower RDL 114 as shown in FIG. 2.

A second dielectric layer 120 is formed over the first pillar 118 with an opening provided therein exposing a portion of the first pillar 118.

An upper RDL 122 is formed in contact with the first pillar 118 as shown in FIG. 2 and is shaped to form a coil or antenna 123 connected to the first pillar 118 at one end and to a second pillar 124 at the other as shown in FIG. 1.

The second pillar 124 is formed at the same time as the first pillar 118 and is connected to the lower RDL 114, which has patterned to form a conductive path 125 and covers a second pad 126 that is formed at the same time as the first pad 110 and also is connected to the first RFID device 106.

A cap dielectric layer 128 is formed over the second dielectric layer 120 and the upper RDL 122 formed into the antenna 123.

In the present invention, it has been discovered that a single thick dielectric layer is workable but by having the first and second dielectric layers 116 and 120 between the substrate 112 and the antenna 123 it is possible to use multiple thinner layers to better control overall thickness. The thickness can be controlled in an otherwise thin package to provide what is termed a "thick dielectric" or thickness above 100,000 Å, which enables electrical field isolation for high-frequency applications up into the GHz range.

As shown in FIGS. 1 and 3, the second antenna system 104 is similar to the first antenna system 102, except that first and second pillars 318 and 324 rest directly on first and second pads 310 and 326 so a lower RDL is not required. The upper RDL 122 is formed into the antenna 123. In this embodiment, the processing and cost is reduced.

Figure 4:
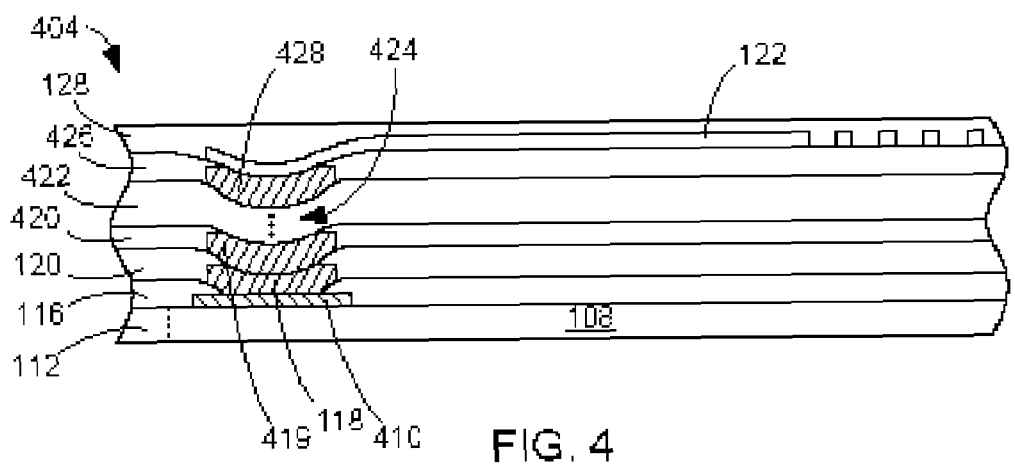
FIG. 4 is a cross-sectional view of a third embodiment of FIG. 1 similar to the structure of FIG. 3.

Referring now to FIG. 4, therein is shown a cross-sectional view of a third embodiment similar to the structure of FIG. 3, which is a third antenna system 404. The plan view would be the same as for the second antenna system 104 in FIG. 1. For the third antenna system 404, the first RFID device 108 is connected to a first pad 410 formed on the substrate 112.

The first dielectric layer 116 is deposited on the substrate 112 and over the first pad 410 with an opening over a portion of the first pad 410 as shown in FIG. 4.

The first pillar 118 is formed over the first dielectric layer 116 in the opening in the first dielectric layer 116 and is in contact with the first pad 410.

The second dielectric layer 120 is formed over the first pillar 118 with an opening provided therein exposing a portion of the first pillar 118.

A second pillar 419 is formed over the second dielectric layer 120 in the opening in the second dielectric layer 120 and is in contact with the first pillar 118.

A third dielectric layer 420 is formed over the second pillar 419 with an opening provided therein exposing a portion of the second pillar 419.

Successive dielectric layers designated by a numeral 422 and sucessive pillars designated by the numeral 424 can be formed up to an upper dielectric layer 426 and a top pillar 428.

The cap dielectric layer 128 is formed over the second dielectric layer 120 and the upper RDL 122 formed into the antenna 123.

In the third antenna system 404, the upper RDL 122 is formed in contact with the top pillar 428 and is shaped to form the antenna 123. The antenna 123 is connected to the top pillar 428 at one end and to a second column of pillars (not shown but the same as the pillars 118, 419, 424, and 428). The second column is connected to a second pad (not shown but the same as the second pad 310) and to the second RFID 108.

This configuration permits the dielectric thickness to be controlled to any desired thickness for even higher frequencies and any gaps in the dielectric layers will be easily filled.

Figure 5:
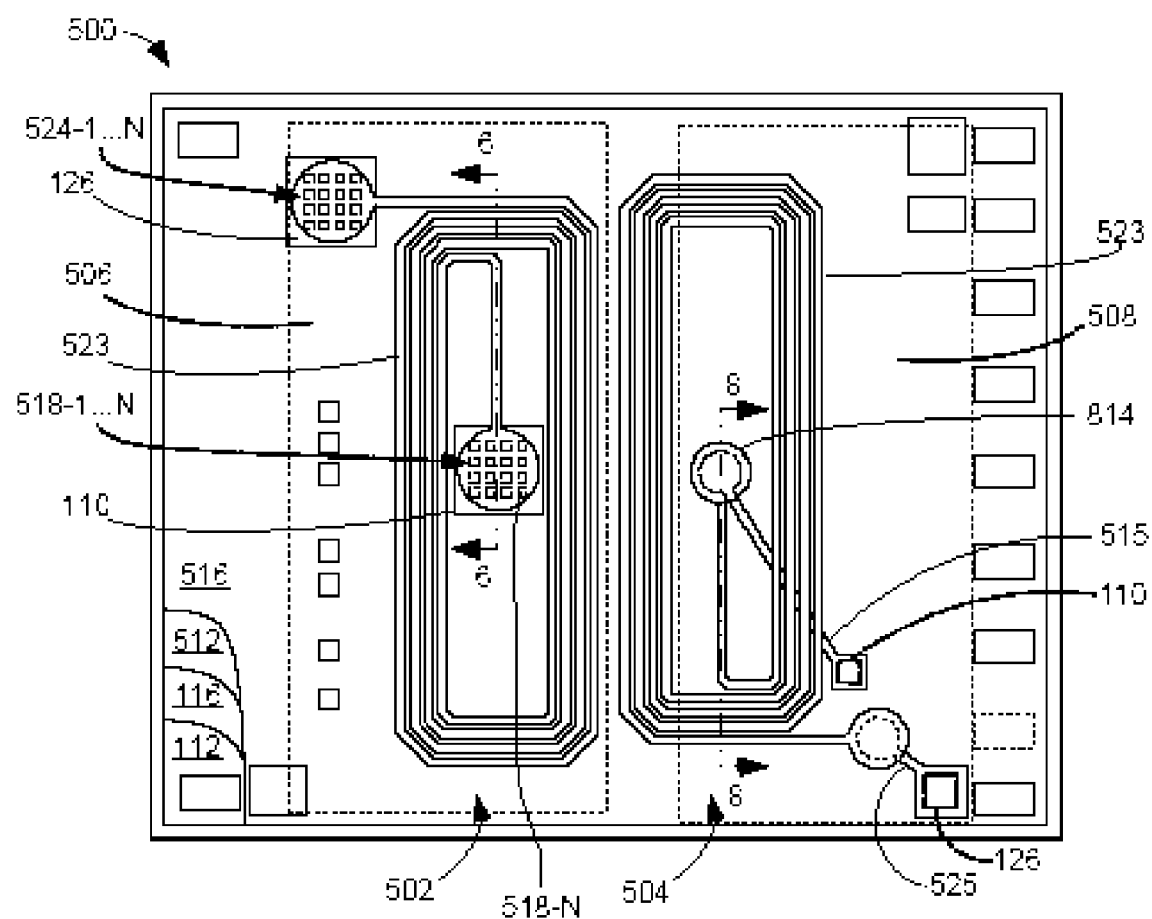
FIG. 5 is a plan view applicable to additional multiple embodiments of a integrated circuit device in accordance of the present invention.
Figure 6:
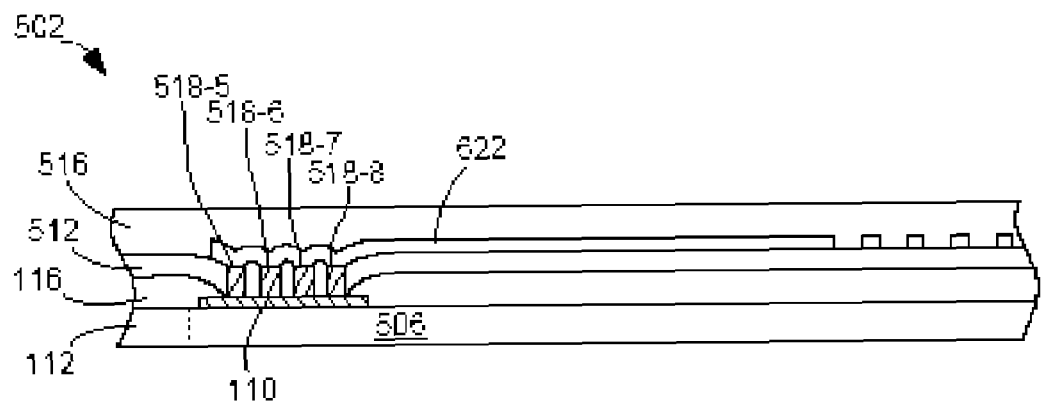
FIG. 6 is a cross-sectional view of a fourth embodiment of FIG. 5 taken along line 6-6.
Figure 7:
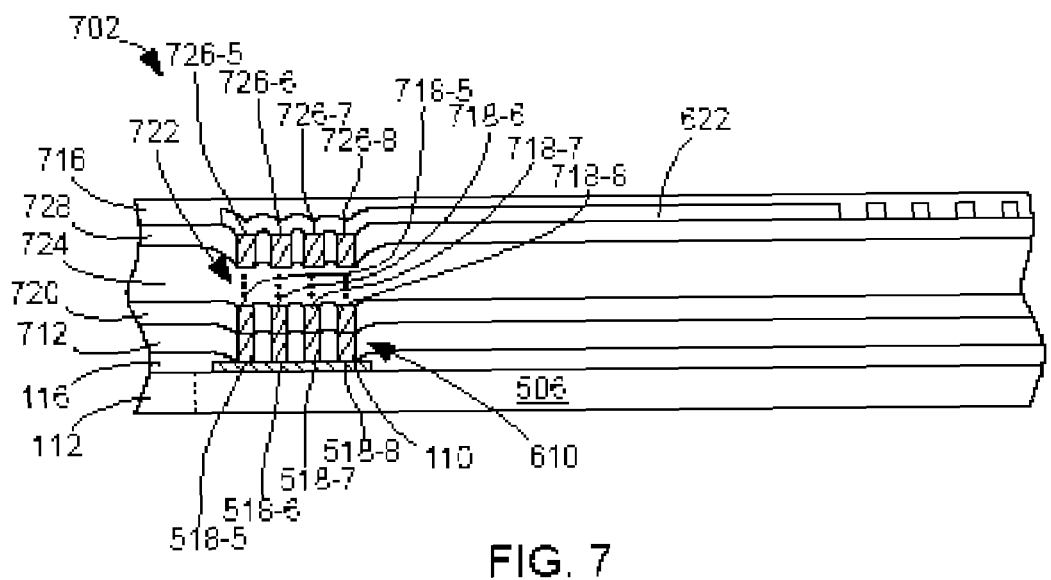
FIG. 7 is a cross-sectional view of a fifth embodiment of FIG. 5 similar to the structure of FIG. 6.

Referring now to FIGS. 5, 6, and 7, therein are shown an integrated circuit system 500. FIG. 5 is a plan view applicable to multiple embodiments of the integrated circuit system 500 in accordance with the present invention. FIG. 6 is a cross-sectional view of a fourth embodiment of FIG. 5 taken along line 6-6, which shows a fourth antenna system 502. FIG. 7 is a cross-sectional view of a fifth embodiment similar to the structure of FIG. 6, which shows a fifth antenna system 602.

The integrated circuit system 500 includes first and second integrated circuit devices, such as first and second RFID devices 506 and 508.

For the fourth antenna system 502, the first RFID device 506 is connected to the first pad 110 on the substrate 112.

The first dielectric layer 116 is deposited on the substrate 112 and over the first pad 110 with an opening over a portion of the first pad 110 as shown in FIG. 6. For ease of explanation, various layers are shown as transparent and the same numbers are used to designate the same or similar elements.

First pillars 518-1 through N are formed in the opening in the first dielectric layer 116 and are in contact with the first pad 110. First pillars 518-5 through 8 are shown in FIG. 6. The number of first pillars depend on a number of factors such as desired conductivity, size, flowability of the dielectric material, etc.

A second dielectric layer 512 is formed around the first pillars 518-1 through N leaving the tops of the pillars exposed as shown in FIG. 6. The dielectric material must be sufficiently flowable to fill any gaps between the pillars.

An upper RDL 622 is formed in contact with the first pillars 518-1 through N over the second dielectric layer 512 as shown in FIG. 6 and is shaped to form a coil or antenna 523 connected to the first pillars 518-1 through N at one end and to second pillars 524-1 through N at the other as shown in FIG. 5.

The second pillars 524-1 through N are formed at the same time as the first pillars 518-1 through N and are connected to the second pad 126 that is formed at the same time as the first pad 110. The second pad 126 is connected to the first RFID 506.

A cap dielectric layer 516 is formed over the second dielectric layer 512 and the upper RDL 622.

In the present invention, it has been discovered that high standoff conductive pillars can be formed up to 10 micron in height and this provides with improved fatigue performance, good electromagnetic performance, and good thermal dissipation. If a single pillar is broken, this does not significantly affect fatigue performance, electromagnetic performance, or thermal dissipation. A high-conductive copper (Cu) can be plated for minimum resistance.

Referring now to FIG. 7, therein is shown a cross-sectional view of a fifth embodiment similar to FIG. 6, which is a fifth antenna system 702. The plan view would be the same as for the fourth antenna system 502 in FIG. 5. For the fifth antenna system 702, the first pad 110 is formed on the substrate 112 and is connected to the first RFID device 506.

The first dielectric layer 116 is deposited on the substrate 112 and over the first pad 110 with an opening over a portion of the first pad 110 as shown in FIG. 7.

First pillars 518-1 through N (represented by the first pillars 518-5 through 8 shown in FIG. 7) are formed in the opening in the first dielectric layer 116 and are in contact with the first pad 110.

A second dielectric layer 712 is formed around the first pillars 518-1 through N leaving the tops of the first pillars 518-1 through N exposed. The dielectric material must be sufficiently flowable to fill any gaps between the pillars.

Second pillars 718-1 through N (only the second pillars 718-5 through 8 are shown in FIG. 7) are formed over and in contact with the first pillars 518-1 through N, respectively.

A third dielectric layer 720 is formed around the second pillars 718-1 through N leaving the tops of the second pillars 718-1 through N exposed. The dielectric material must be sufficiently flowable to fill any gaps between the pillars.

Succesive levels of pillars designated by the numeral 722 are formed directly onthe second pillars 718-1 through N and succesive dielectric layers designated by thenumeral 724 are formed around the successive levels of pillars 722.

Upper pillars 726-1 through N (represented by the upper pillars 726-5 through 8 shown in FIG. 7) are formed over and in contact with the successive layers of pillars 722.

An upper dielectric layer 728 is formed around the upper pillars 726-1 through N leaving the tops of the second pillars 726-1 through N exposed. The dielectric material must be sufficiently flowable to fill any gaps between the pillars.

In the fifth antenna system 602, the first RDL 622 is formed in contact with the upper pillars 726-1 through N and is shaped to form a coil or antenna (the same as the antenna 523 of FIG. 5) connected to the upper pillars 726-1 through N at one end and to second columns of pillars (not shown but the same as the upper pillars 726-1 through N). The second column of pillar are formed at the same time as the first column of pillars and are connected to a second pad (not shown). The second pad is connected to the first RFID 506.

This configuration permits the dielectric thickness to be controlled to any desired thickness for even higher frequencies and any gaps in the dielectric layers will be easily filled.

A cap dielectric layer 716 is formed over the upper dielectric layer 728 and the first RDL 622 formed into the antenna 523.

Figure 8:
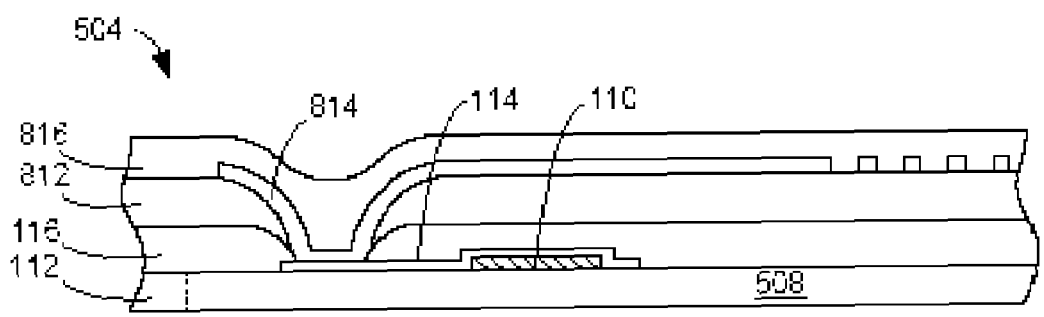
FIG. 8 is a cross-sectional view of a sixth embodiment of FIG. 5 taken along line 8-8.

Referring now to FIG. 8, therein is shown a cross-sectional view of a portion of a sixth antenna system 504 of a sixth embodiment taken along line 8-8 of FIG. 5.

For the sixth antenna system 504, the second RFID device 508 is connected to the first pad 110 formed on the substrate 112. A lower RDL 114 is formed over the substrate 112 and the first pad 110, and is patterned to form the conductive path 515 as shown in FIG. 5.

The first dielectric layer 116 is deposited on the substrate 112 and over the lower RDL 114 with an opening over a portion of the lower RDL 114. For ease of explanation, various layers are shown as transparent and the same numbers are used to designate the same or similar elements.

A second dielectric layer 812 is formed over the first dielectric layer 116 with an opening provided therein exposing a portion of the lower RDL 114.

An upper RDL 814 is formed in contact with the lower RDL 114 and is shaped to form a coil or antenna 523 (FIG. 5) connected to the lower RDL 114 at both ends as shown in FIG. 5.

The lower RDL 114 is patterned to form a conductive path 525 and covers the second pad 126 that is formed at the same time as the first pad 110. The second pad 126 is connected to the second RFID 508.

A cap dielectric layer 816 is formed over the second dielectric layer 812 and the upper RDL 814.

In the present invention, it has been discovered that having the first and second dielectric layers 116 and 812 between the substrate 112 and the upper RDL 814 provides what is termed a "thick dielectric", which results in electrical field isolation for high-frequency applications. In the sixth antenna system 504, the direct connection between the lower RDL 114 and the upper RDL 814 eliminates the use of the pillar 118 (FIG. 2) or pillars 118, 419, 424, and 428 (FIG. 4) which means less cost due to the elimination of photomasking and processing steps. It will be understood that the use of the sixth antenna system 504 does not preclude the use of a pillar 118 (FIG. 2) or pillars 118, 419, 424, and 428 (FIG. 4) since such a layer may be required for other routing purposes. The structure of the sixth antenna system 504 further provides good electrical performance by minimizing electrical parasitic capacitances.

Figure 9:
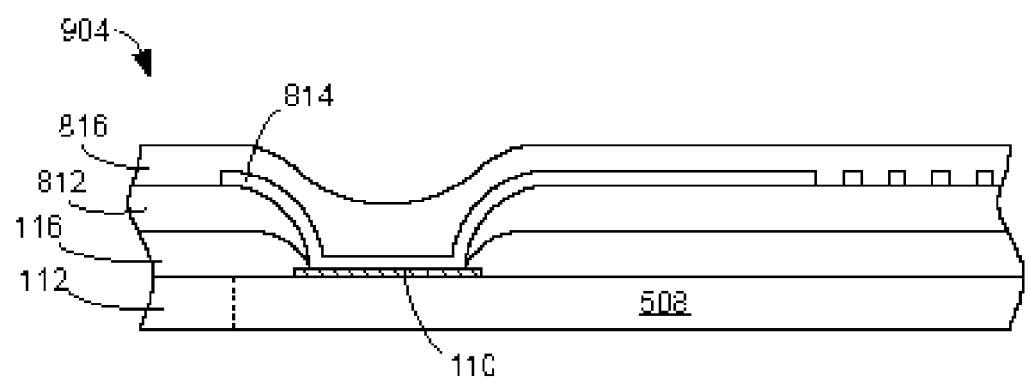
FIG. 9 is a cross-sectional view of a seventh embodiment of FIG. 5 similar to FIG. 8.

Referring now to FIG. 9, therein is shown a cross-sectional view of a seventh antenna system 904 of a seventh embodiment.

As shown in FIG. 9, the seventh antenna system 904 is similar to the sixth antenna system 504, except that the upper RDL 814 rests directly on first pads 110 so a first RDL is not required. In this embodiment, the processing and cost is reduced.

Figure 10:
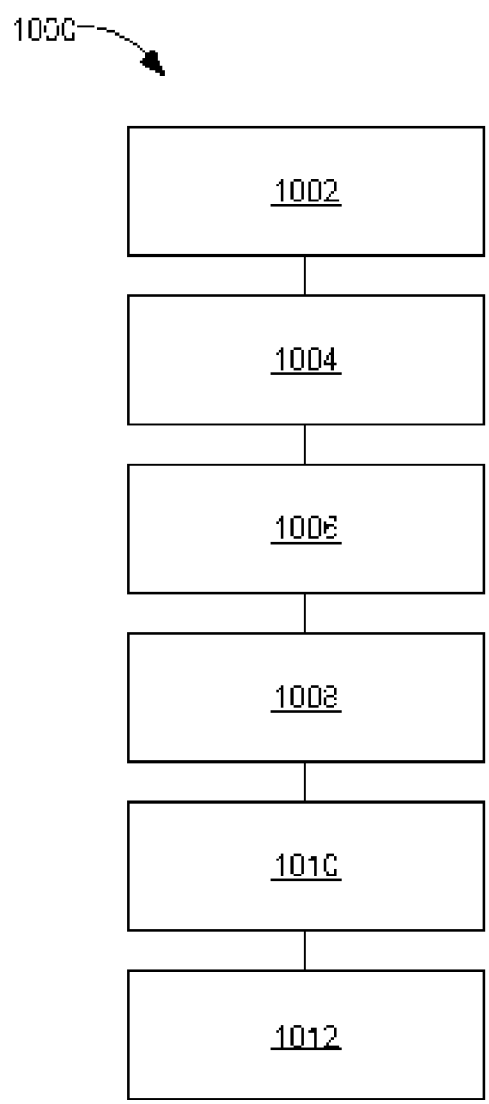
FIG. 10 is a method for manufacturing an integrated circuit system in accordance with the present invention.

Referring now to FIG. 10, therein is shown a flow chart of a manufacturing method or system 1000 for manufacturing an integrated circuit in accordance with the present invention. The system 1000 includes forming a substrate having a integrated circuit device provided thereon in a block 1002; forming a first pad on the substrate connected to the integrated circuit device in a block 1004; forming a first dielectric layer over the substrate and the first pad, the first dielectric layer having an opening provided therein exposing the first pad in a block 1006; forming an upper redistribution layer over the first dielectric layer in a block 1008; forming at least a portion of the upper redistribution layer into an antenna, the antenna connected to the first pad in a block 1010; and forming a second dielectric layer over the first dielectric layer and over the antenna in a block 1012.

Thus, it has been discovered that the radio frequency identification integrated circuit manufacturing method and apparatus of the present invention furnish important and heretofore unknown and unavailable solutions, capabilities, and functional advantages for radio frequency identification integrated circuits. The resulting process and configurations are straightforward, economical, uncomplicated, highly versatile, accurate, sensitive, and effective, and can be implemented by adapting known components for ready manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters set forth herein or shown in the accompanying drawings are to be interpreted in an illustrative and non-limiting sense.

What is claimed is:

1. A process for manufacturing an integrated circuit process comprising: forming a substrate having an integrated circuit device;

forming a first pad on the substrate connected to the integrated circuit device;

forming a first dielectric layer over the substrate and the first pad, the first dielectric layer having an opening provided therein exposing the first pad;

forming an upper redistribution layer over the first dielectric layer;

forming at least a portion of the upper redistribution layer into an antenna having two ends, the antenna connected to the first pad;

forming a plurality of pillars on the first pad, the plurality of pillars connected to one end of the antenna;

forming a second pillar connected to the other end of the antenna at the same time as forming the plurality of pillars on the first pad;

forming a second pad connected to the second pillar; and forming a second dielectric layer over the first dielectric layer and over the antenna.

2. The process as claimed in claim 1 further comprising forming a lower redistribution layer on the first pad and connected to the antenna.

3. The process as claimed in claim 1 further comprising forming a pillar on the first pad and over the first dielectric layer, the pillar connected to the antenna.

4. The process as claimed in claim 1 further comprising:

forming a first pillar on the first pad;

forming a third dielectric layer over the first pillar, the third dielectric layer having an opening provided therein exposing the first pillar; and forming a second pillar on the pad in the opening in the third dielectric layer, the second pillar in contact with the antenna.

5. A process for manufacturing an integrated circuit process comprising: forming a substrate having a radio frequency identification integrated circuit device; forming a first pad on the substrate connected to the radio frequency identification integrated circuit device;

forming a first dielectric layer over the substrate and the first pad, the first dielectric layer having an opening provided therein exposing the first pad;

forming an upper redistribution layer over the first dielectric layer;

forming at least a portion of the upper redistribution layer into an antenna having two ends, the antenna connected to the first pad;

forming a plurality of pillars on the first pad, the plurality of pillars connected to one end of the antenna;

forming a second pillar connected to the other end of the antenna at the same time as forming the plurality of pillars on the first pad;

forming a second pad connected to the second pillar; and forming a second dielectric layer over the first dielectric layer and over the antenna.

6. The system as claimed in claim 5 further comprising forming a lower redistribution layer on the first pad and connected to the antenna.

7. The system as claimed in claim 5 further comprising forming a pillar on the first pad and over the first dielectric layer, the pillar connected to the antenna.

8. The system as claimed in claim 5 further comprising:

forming a first pillar on the first pad;

forming a third dielectric layer over the first pillar, the third dielectric layer having an opening provided therein exposing the first pillar; and forming a second pillar on the pad in the opening in the third dielectric layer, the second pillar in contact with the antenna.

* * * * *